US007815729B2

(12) United States Patent
Cummings et al.

(10) Patent No.: US 7,815,729 B2
(45) Date of Patent: Oct. 19, 2010

(54) METHOD FOR RECYCLING CONSTRUCTION AND DEMOLITION FINES

(76) Inventors: Robert S. Cummings, 7 Allen Rd., Rochester, MA (US) 02770; Paul G. Chuckran, 925 Colonial Dr., Bridgewater, MA (US) 02324

( * ) Notice: Subject to any disclaimer, the term of this patent is extended or adjusted under 35 U.S.C. 154(b) by 0 days.

(21) Appl. No.: 12/379,962

(22) Filed: Mar. 5, 2009

(65) Prior Publication Data

US 2010/0224101 A1 Sep. 9, 2010

(51) Int. Cl.
C04B 18/16 (2006.01)
(52) U.S. Cl. .................. 106/713; 106/731; 106/735; 106/737; 106/772
(58) Field of Classification Search .............. 106/713, 106/737, 731, 735, 772
See application file for complete search history.

(56) References Cited

U.S. PATENT DOCUMENTS

| 5,173,115 | A | * | 12/1992 | Glynn, Jr. et al. ......... 106/281.1 |
|---|---|---|---|---|
| 5,223,031 | A | * | 6/1993 | Sugi et al. ................. 106/277 |
| 5,288,171 | A | * | 2/1994 | Smith et al. .............. 405/129.9 |
| 5,320,450 | A | | 6/1994 | Smith et al. |
| 5,333,738 | A | | 8/1994 | Fuchs et al. |
| 5,350,451 | A | * | 9/1994 | Patterson ................... 106/805 |
| 5,445,330 | A | | 8/1995 | Shokry Rashwan et al. |
| 5,525,153 | A | * | 6/1996 | Cosola ...................... 106/697 |
| 5,647,545 | A | | 7/1997 | Conner |
| 5,725,655 | A | * | 3/1998 | Catterton et al. ........... 106/738 |
| 5,855,664 | A | | 1/1999 | Bielecki et al. |
| 6,382,425 | B1 | | 5/2002 | Brickner et al. |
| 7,284,717 | B1 | | 10/2007 | Pfaff |
| 2003/0019795 | A1 | | 1/2003 | Yilmaz |
| 2003/0122283 | A1 | * | 7/2003 | De La Concha Estrada . 264/333 |
| 2003/0167970 | A1 | * | 9/2003 | Polston ................... 106/281.1 |
| 2004/0148876 | A1 | | 8/2004 | McManus et al. |
| 2008/0085160 | A1 | | 4/2008 | Taylor |

FOREIGN PATENT DOCUMENTS

| JP | 10-258242 | 9/1998 |
|---|---|---|
| JP | 2002-001293 | 1/2002 |
| JP | 2002-053362 | 2/2002 |

OTHER PUBLICATIONS

"Effects of concrete durability of using recycled ceramic aggregates", Correia et al., Materials and Structures (Dordrecht, Netherlands) (2006), 39(2), 169-177.*
"Precast concrete building blocks made with aggregates derived from construction and demolition waste", Soutsos et al., RILEM Proceedings (2004), PRO 40 (International RILEM Conference on the Use of Recycled Materials in Buildings and Structures) 2004, vol. 2, p. 571-579. abstract only.*
"Demolition solid waste—A source of coarse aggregate for concrete", Aggarwal et al., Proceedings of the International Conference on Solid Waste Technology and Mgmt (2007), 22nd, 509/1-509/8.*
"Demolition solid waste—A source of coarse aggregate for concrete, Aggarwal et al., Proceedings of the International Conference on Solid Waste Technology and Mgmt (2007), 22nd 509/1-509/8. Abstract Only.*
"Properties of HPEC with recycled aggregates" Tu et al., Cement and Concrete Research (2006), 36(5), 943-950.*
"Properties of HPEC with recycled aggregates", Tu et al., Cement and Concrete Research (2006), 36(5), 943-950. Abstract only.*
"Mechanical behaviour of non-structural concrete made with recycled ceramic aggregates" de Brito et al., Cement and Concrete Composites (2005), 27(4), 429-433.*
"Mechanical behaviour of non-structural concrete made with recycled ceramic aggregates", de Brito et al., Cement and Concrete Composites (2005), 27(4), 429-433. Abstract only.*
"Leaching and mechanical behaviour of concrete manufactured with recycled aggregates", Sani et al., Waste Management (Amsterdam, Netherlands) 2005, 25(2), 177-182.*
"Leaching and mechanical behaviour of concrete manufactured with recycled aggregates", Sani et al., Waste Management (Amsterdam, Netherlands) 2005, 25(2), 177-182. Abstract only.*
"Recycling of concrete from demolition wastes", Hassan et al., Mansoura Science Bulletin A: Chemistry (2004), 31(1), 13-27.*
"Recycling of concrete from demolition wastes", Hassan et al., Mansoura Science Bulletin A: Chemistry (2004), 31(10, 13-27. Abstract only.*
"Value added recycling of domestic, industrial, and construction arisings as concrete aggregate", Dhir et al., Concrete Engineering International (2004), 8(1), 43-48.*
"Value added recycling of domestic, industrial, and construction arisings as concrete aggregate", Dhir et al., Concrete Engineering International (2004), 8(1), 43-48. Abstract only.*
"Recycled Concrete", Advanced Concrete Technology (2003), vol. 3, 8/1-8/13. Collins. abstract.*
"Recycled Concrete", Advanced Concrete Technology (2003), vol. 3 8/1-8/13. Collins. article.*
"Recycled Construction debris as aggregates. Production of Concrete Blocks", Sousa et al., Materiales de Construccion (Madrid Spain), 2003, 53 (271-272), 59-70.*
"Recycled Construction debris as aggregates. Production of Concrete Blocks", Sousa et al., Materials de Construccion (Madrid Spain), 2003, 53 (271-272) 59-70. Abstract only.*
"Building Materials From Waste", Weimann et al., Materials Transactions (2003), 44(7), 1255-1258.*

(Continued)

*Primary Examiner*—Paul Marcantoni
(74) *Attorney, Agent, or Firm*—Richard C. Litman

(57) ABSTRACT

The method for recycling construction and demolition fines involves using mixed fines from construction and demolition debris that would otherwise be disposed of at landfills as an ingredient in cement or concrete. The mixed fines contain a plurality of materials selected from the group consisting of asphalt, plastics, ceramics, fiberglass and batt insulation, soil, dust, drywall, wood, plaster, paper, cardboard, dirt. The fines may also contain particles of recyclable materials, such as concrete, bricks, mortar, metals, glass, and the like. The fines may range in size from microns up to 6 inches in at least one direction. The recycler may incorporate the fines into a concrete mix for bulk sale to commercial enterprises, or may himself form precast, lightweight concrete products, such as decorative columns, pedestals and table bases, trim moldings and cornices, door surrounds, etc.

3 Claims, No Drawings

OTHER PUBLICATIONS

"Building Materials from Waste", Weimann et al., Materials Transactions (2003), 44(7), 1255-1258. abstract only.*
"Construction and Demolition Debris Samples make Concrete with Tensile Strength Above Primary Aggregates Concrete", Coelho, Materials Engineering (Modena, Italy), 1998, 9(2), 175-184.*
"Construction and Demolition Debris Samples make Concrete with Tensile Strength Above Primary Aggregates Concrete", Coelho, Materials Engineering (Modena, Italy), 1998, 9(2), 175-184. Abstract only.*
"Performance and durability of Concrete made with Demolition Waste and Artificial Fly ash-Clay Aggregates", Zakaria et al., Waste Management (Oxford) 1996, 16(1-3), 151-158.*
"Performance and durability of Concrete made with Demolition Waste and Artificial Fly Ash-Clay Aggregates", Zakaria et al., Waste Management (Oxford), 1996, 16(1-3_, 151-158. Abstract only.*
EP 1167319 A1 (Jan. 2, 2002) Gimenez Ruiz, abstract only.*
"Experimental study on use of construction wastes to make eco-concrete blocks", He et al., Jianzhu Cailiao Xuebao (2007), 10(5), 592-597. abstract only.*
CN 101269939 (Sep. 24, 2008), Hong et al. (abstract only).*
"Effects of different materials in the construction waste on the properties of concrete", Shi et al., Hunningtu (2008), (6), 11-13. abstract only.*
CN 101161602 A (Apr. 16, 2008) Huang et al. abstract only.*
"Experimental study on physical properties of recycled aggregate concrete", Kasai et al., Semento, Konkurito Ronbunshu (1996), 50, 802-807. abstract only.*
KR 761710 (Oct. 4, 2007) Chun, abstract only.*
CN 101058489 (Oct. 24, 2007) Zhang, abstract only.*
JP 04349158 (Nagashima) Dec. 3, 1992 abstract only.*
"Recycled Aggregate in Concrete", Vazquez et al., RILEM Report (2005), 30 (Advanced Testing of Cement Based Materials During Setting and Hardening), 41-43. abstract only.*
"Recycled Aggregate in Concrete", Vazquez et al., RILEM Report (2005), 30 (Advanced Testing of Cement Based Materials During Setting and Hardening), 41-43. article only.*
"Moving Forward," Townsend, Construction & Demolition Recycking, May 2003, 4 pages, reprinted at www.cdrecycler.com/articles/article.asp?Id=4626.

* cited by examiner

METHOD FOR RECYCLING CONSTRUCTION AND DEMOLITION FINES

BACKGROUND OF THE INVENTION

1. Field of the Invention

The present invention relates to waste disposal and recycling, and particularly to a method for recycling construction and demolition fines, and to a recycled product formed from such fines.

2. Description of the Related Art

In recent years many environmental concerns have been raised concerning the disposal of solid waste material. Landfills that have accumulated sold waste are running out of space. Many landfills have been shown to be the source or site of toxic waste that has spread to the surrounding communities, or have been suspected or feared of harboring and spreading toxins. Moreover, natural resources have been used up and discarded in solid waste facilities, raising concerns that these natural resources are becoming scarce or are in short supply.

As a result, there is growing interest in efforts to recycle solid waste materials. Building and road construction and building demolition produce a considerable amount of waste, known in the trade as construction and demolition (C&D) debris. C&D debris includes a wide variety of materials, including concrete, bricks, mortar, masonry, asphalt, metals, plastics, glass, ceramics, fiberglass and batt insulation, soil, dust, drywall, wood, plaster, paper, cardboard, dirt, and other materials.

In some areas, concrete is being successfully recycled. The larger pieces of concrete are sorted out from the debris and crushed to form recycled concrete aggregate (RCA), which is recycled to form recycled aggregate concrete (RAC). Japanese Patent No. 2002-053362, published Feb. 19, 2002, is representative of this approach (see the Abstract, "reutilization of concrete debris", "steps of: recycling concrete debris", etc.). The smaller RCA fines are sometimes recycled to form mortar or other masonry products. Similarly, larger pieces of glass, metal, paper, and drywall may be sorted from the debris and recycled. However, inevitably there is a residue of finer particles resulting from the crushing, shredding, or grinding of the C&D debris that has a mixed composition, referred to as C&D debris fines, that heretofore could not be economically recycled and is therefore simply dumped at the landfill for disposal.

The only current uses for C&D debris fines are limited to alternative daily cover (ADC) for landfills, soil beds or road beds, earth engineering uses, and the like. Even use for these purposes is sometimes problematical. For example, it has been estimate that C&D debris fines contain about 20% drywall by weight. Drywall contains gypsum (calcium sulfate), which is often converted to hydrogen sulfate when used as ADC in landfills. The resulting odor, similar to rotten eggs, is noxious, and in high enough concentrations, may leach into the soil and underground water, potentially posing a health hazard or damaging nearby crops or vegetation.

Consequently, there is a need for a more economically profitable and environmentally friendly way of recycling C&D fines. Thus, a method for recycling construction and demolition fines solving the aforementioned problems is desired.

SUMMARY OF THE INVENTION

The method for recycling construction and demolition fines involves using mixed fines from construction and demolition debris that would otherwise be disposed of at landfills as an ingredient in cement or concrete. The mixed fines contain a plurality of materials selected from the group consisting of asphalt, plastics, ceramics, fiberglass and batt insulation, soil, dust, drywall, wood, plaster, paper, cardboard, and dirt. The fines may also contain particles of recyclable materials, such as concrete, bricks, mortar, metals, glass, and the like. The fines may range in size from microns up to 6 inches in at least one direction. The recycler may incorporate the fines into a dry cement mix for bulk sale to commercial enterprises, or may himself form precast, lightweight concrete products, such as decorative columns, pedestals and table bases, trim moldings and cornices, door surrounds, etc.

The fines may be suspended in the concrete products to form a mixture of materials, or the fines may be chemically altered and incorporated into the concrete, depending upon the composition of the fines and the composition of the concrete.

These and other features of the present invention will become readily apparent upon further review of the following specification.

DETAILED DESCRIPTION OF THE PREFERRED EMBODIMENTS

The method for recycling construction and demolition fines involves using mixed fines from construction and demolition debris that would otherwise be disposed of at landfills as an ingredient in cement or concrete. The mixed fines contain a plurality of materials selected from the group consisting of asphalt, plastics, ceramics, fiberglass and batt insulation, soil, dust, drywall, wood, plaster, paper, cardboard, and dirt. The fines may also contain particles of recyclable materials, such as concrete, bricks, mortar, metals, glass, and the like. The fines may range in size from microns up to 6 inches, preferably up to 3 inches, in at least one direction. The recycler may incorporate the fines into a dry cement mix for bulk sale to commercial enterprises, or may himself form precast, lightweight concrete products, such as decorative columns, pedestals and table bases, trim moldings and cornices, door surrounds, piers, wall caps, pavers, site furnishings, stair treads, flowerpots, blocks, bricks, and other applications that require low strength, lightweight concrete.

By adding polymer or other strengthening agents, a higher strength concrete can be produced, which may broaden the range of concrete products that may be formed incorporating C&D fines.

The fines may be suspended in the concrete products to form a mixture of materials, or the fines may be chemically altered and incorporated into the concrete, depending upon the composition of the fines and the composition of the concrete.

In order to evaluate the viability of the potential applications of concrete incorporating C&D fines, the inventors prepared various mixtures of cement, stone aggregate, sand, and C&D fines. The resulting concrete was tested for strength using conventional tests. The results are shown in the following Table. It will be noted, for example, that a mixture containing 80% C&D fines and 20% cement by volume can produce concrete that is 30% lighter than standard concrete. It will be understood that as the percentage of C&D fines increases, the cost of producing the resulting concrete goes down, since the unit cost of the remaining ingredients is higher than C&D fines while the proportion of the remaining, ingredients required to produce the same volume of concrete goes down.

TABLE 1

Strength vs. % Fines by Volume

| Sample | 1 | 2 | 3 | 4 | 5 | 6 | 7 |
|---|---|---|---|---|---|---|---|
| Cement (unit vol.) | 0.5 | 0.5 | 0.5 | 0.5 | 0.5 | 0.5 | 0.5 |
| Cement (% Tot. vol.) | 20 | 20 | 20 | 20 | 20 | 20 | 20 |
| Sand (unit vol.) | 1 | 0.7 | 0.5 | 0.25 | 0 | 0 | 0 |
| Sand (% Tot. vol.) | 40 | 30 | 20 | 10 | 0 | 0 | 0 |
| Stone (unit vol.) | 1 | 1 | 1 | 1 | 1 | 0.5 | 0 |
| Stone (% Tot. vol.) | 40 | 40 | 40 | 40 | 40 | 20 | 0 |
| Fines (unit vol.) | 0 | 0.25 | 0.50 | 0.75 | 1 | 1.5 | 2 |
| Fines (% Tot. vol.) | 0 | 10 | 20 | 30 | 40 | 60 | 80 |
| Unit weight (lbs/cf) | 142.7 | 138.3 | 132.7 | 125.8 | 121.3 | 104.8 | 96.3 |
| Strength (P.S.I.) | 4290 | 2650 | 700 | 880 | 880 | 530 | 530 |

It is to be understood that the present invention is not limited to the embodiments described above, but encompasses any and all embodiments within the scope of the following claims.

We claim:

1. A method of recycling construction and demolition fines, comprising the steps of:
   a) admixing mixed construction and demolition fines with cement in order to produce a lightweight concrete from recycled material, wherein i) said mixed fines have a size between three microns and six inches and ii) said mixed fines comprise particles made of at least two different materials, one of the two materials being gypsum drywall and the other material selected from the group consisting of asphalt, plastics, ceramics, fiberglass and batt insulation, soil, dust, wood, plaster, paper, cardboard, and dirt; and
   b) forming concrete from the admixture of cement with the mixed construction and demolition fines, the cement comprising approximately 20% and the mixed fines comprising between about 10% to 80% of ingredients used to form the concrete.

2. The method of recycling construction and demolition fines according to claim 1, further comprising the step of forming a precast concrete article from the admixture of cement with the mixed construction and demolition fines.

3. The method of recycling construction and demolition fines according to claim 2, wherein the precast concrete article is selected from the group consisting of decorative columns, pedestals and table bases, trim moldings and cornices, door surrounds, piers, and wall caps.

* * * * *